UNITED STATES PATENT OFFICE.

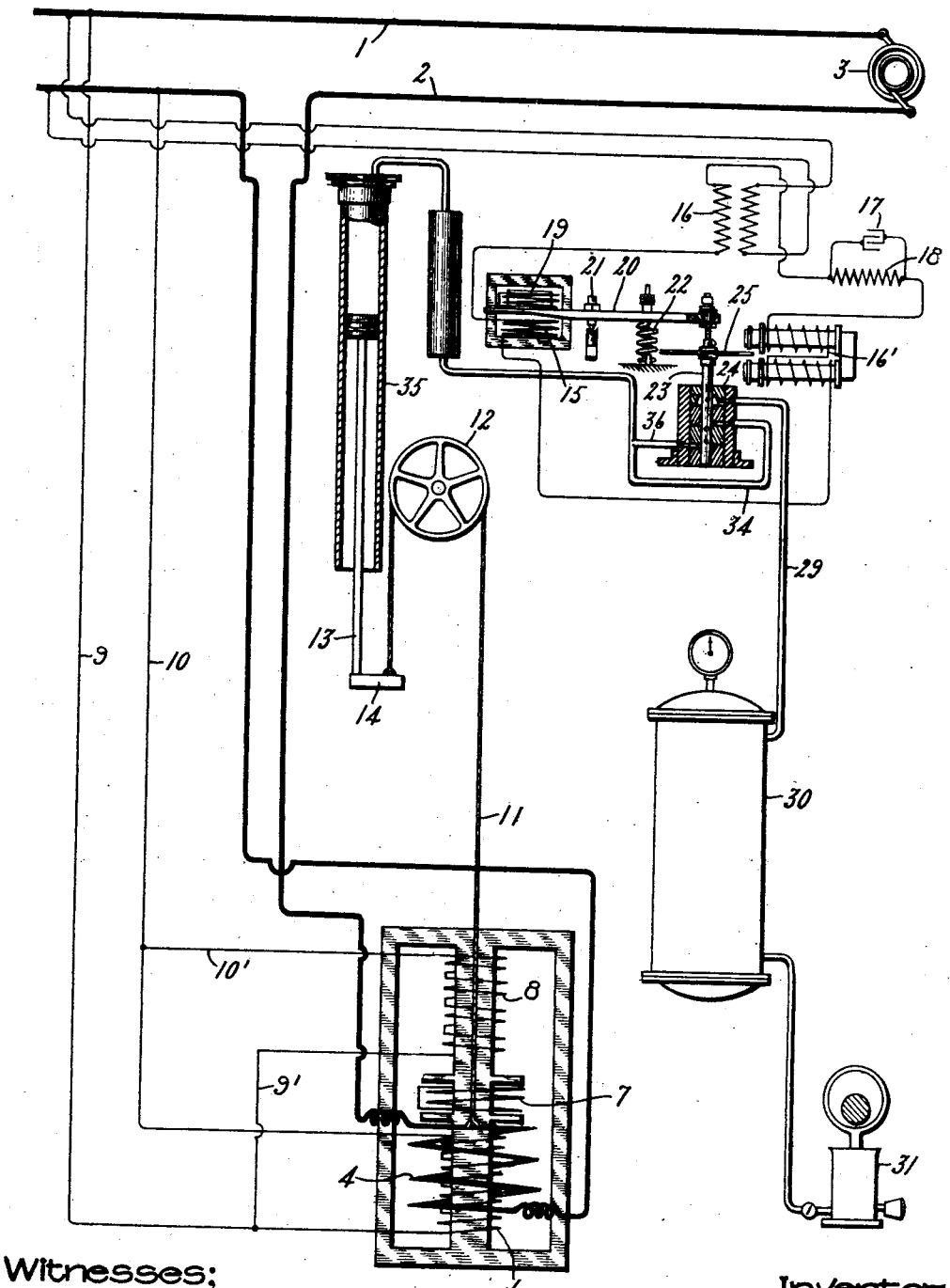

RICHARD FLEMING, OF LYNN, MASSACHUSETTS, ASSIGNOR TO GENERAL ELECTRIC COMPANY, A CORPORATION OF NEW YORK.

VOLTAGE-REGULATOR.

971,184. Specification of Letters Patent. Patented Sept. 27, 1910.

Application filed July 23, 1908. Serial No. 444,883.

*To all whom it may concern:*

Be it known that I, RICHARD FLEMING, a citizen of the United States, residing at Lynn, county of Essex, State of Massachusetts, have invented certain new and useful Improvements in Voltage-Regulators, of which the following is a specification.

My invention relates to means for regulating the electrical condition in an alternating-current circuit.

I have illustrated my invention in connection with a regulator for maintaining an alternating-current at constant voltage by varying the inductive relation of a movable series coil and a fixed set of shunt coils, and in which the displacement of said series coil is controlled by the repulsion between two other coils placed in inductive relation to each other, and one of which coils is short-circuited, while the other is charged with current in accordance with the potential of the line, so that the current induced in the short-circuited coil varies with the line voltage, and, therefore variations in line voltage will vary the repulsive force exerted between the coils. If constant voltage is to be maintained it is important that the regulating means should be responsive to changes of voltage only and not to moderate changes of other electrical conditions, such as the frequency of the current.

It is the purpose of my invention to make the response of the regulator rapid and efficient with respect to voltage variations and to exclude as completely as possible the effect of variations of frequency.

It will be seen that my invention is not limited to the particular form of regulator shown.

My invention comprises other novel features of construction, which will be pointed out in the appended claims.

The accompanying drawing, which forms a part of this specification, shows a diagram of circuits and general arrangement of parts of the invention.

The line 1 2 is supplied with an alternating current from the generator 3. In series with the line is a movable coil 4 shown by heavy lines. The coil 4 is placed in inductive relation to the coils 6, 7 and 8, all of which are mounted on the core 9. The coils 6 and 8, each in shunt from the line, are oppositely wound, so that if in the position of coil 4, as shown, an electromotive force is induced in it by the coil 6 tending to decrease its own electromotive force, the electromotive force which would be induced by coil 8, if coil 4 were moved upward would tend to assist the electromotive force in coil 4. The coils 6 and 8 are connected across the line 1 2 by conductors 9, 10, 9' 10' as clearly shown. The short-circuited coil 7 is placed in an intermediate position between coils 6 and 8, so that when coil 4 is raised in the operation of the regulator the change in electromotive force induced in it will be gradual. The coil 4 is connected to one end of the cable or cord 11, which passes over a pulley and has its other end connected to the piston rod 13 at the cross-piece 14. The potential coil 15 is in the circuit of the secondary of a potential transformer 16, as shown in the drawing, or it may be connected directly across the line, if so desired. The coil 15, whose purpose will be again referred to, is connected in series with the field 16' of a shaded-pole motor, and has included in it a condenser 17 in parallel with a non-inductive resistance 18, the purpose of which will be hereinafter explained. A short-circuited coil 19 is placed in inductive relation to the coil 15 and is attached to the lever 20 having its pivots at 21. The weight of the coil 19 is counterbalanced by the spring 22. The lever 20 is attached at its opposite end to the tubular valve 23. The valve 23 is kept in constant rotation in its sectional valve seat 24 by the rotation of the disk armature 25 in order to keep the valve alive or prevent sticking.

The valve 23 is movable up and down in accordance with the motion of the coil 19. The tubular valve 23 is divided into two compartments separated by a partition. The lower compartment opens into the atmosphere. The upper compartment is adapted to be constantly supplied with air or other fluid under pressure. The compressed air is supplied to the valve by means of a pipe 29 connected with a storage tank 30. The tank 30 is kept supplied with compressed air by means of a pump 31. In the position of the valve as shown in the drawing the two lower sets of ports are just covered by the lower part of the valve seat. As the valve is raised the middle ports are uncovered and compressed air is admitted through these ports to the pipe 34, which communicates with the cylinder 35 controlling the movement of coil 4. When the tubular valve is lowerd these ports are again covered and the lower ports are carried down into a recess in the lowermost section of the valve seat and are thus uncovered, admitting air from the cylinder 35 through the pipe 36 into the lower compartment, from where it may exhaust into the atmosphere.

The operation of the regulator is as follows: With a rising voltage on lines 1 2 more current will flow through the coil 15, and as this will in turn induce a larger current in the coil 19, the repulsive force exerted by these coils upon each other will be increased. This will cause the valve 23 to move downward, exhausting air from the cylinder 35, thus lowering the coil 4. The coil 4 will thus be placed in close inductive relation with the coil 6, which coil tends to decrease the electromotive force in coil 4. The drawing shows the coil in this position. Coil 8 will induce an assisting electromotive force in coil 4 and thus raise its voltage and consequently that of the line. The effect of a drop of line voltage will now be obvious, and need not be traced in detail. Should, however, the frequency of the alternating current in line 1 2 rise above the normal, the reactance of the circuit containing coil 15 will be increased, and the current traversing this coil would be decreased, thus producing the same effect as the lowering of the voltage. In order to make the change in the current produced by the variation of frequency as little as possible the capacity 17 and resistance 18 are included in the circuit. As the current in the circuit is proportional to the total impedance, and as the impedance is made up of two factors, the resistance and reactance, of which the latter only is affected by the frequency, it will be seen that the effect of change of frequency would be almost eliminated by reducing the total reactance to a minimum. This is accomplished by so proportioning the self-induction and capacity that they will be as nearly zero as practical at the working frequency of the regulator.

While the total reactance will vary from zero as the frequency changes either way from the working frequency the ultimate effect upon the current will be slight if the resistance in the circuit is comparatively large. It is therefore to be understood that the resistance 18 is to be made large enough to prevent a considerable resonant rise of potential in the circuit of coil 15 at the normal frequency. By using this arrangement I have obtained close regulation with a frequency varying by 15% either way from the working frequency.

What I claim as new and desire to secure by Letters Patent of the United States, is,—

1. A regulator for an alternating current system and a controller therefor in a circuit charged from the line, in combination with means for rendering said circuit substantially neutral to variations of line frequency.

2. A regulator for an alternating current system and a controller therefor in a circuit charged from the line, in combination with means for rendering the current received in said circuit substantially independent of the line frequency.

3. A regulator for an alternating current system and a controller therefor in a circuit charged from the line, in combination with means for rendering the circuit resonant to the normal frequency, and means for damping said circuit.

4. A regulator for an alternating current system and a controller therefor in a circuit charged from the line, in combination with a condenser in said circuit for neutralizing the inductance reactance in the circuit for the normal frequency and a non-inductive resistance for damping the electrical oscillations in said circuit.

5. The combination of a line carrying an alternating current, a regulating device, and means for making said regulating device substantially unaffected by changes of frequency of the current carried by the line.

In witness whereof, I have hereunto set my hand this 21st day of July, 1908.

RICHARD FLEMING.

Witnesses:
 BENJAMIN B. HULL,
 HELEN ORFORD.